C. GRAF.
LENS.
APPLICATION FILED JUNE 21, 1917.
1,293,086. Patented Feb. 4, 1919.
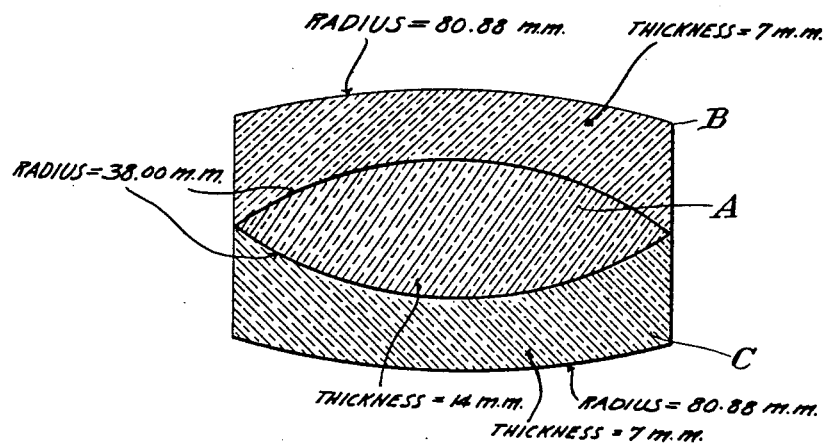
Indices of Refraction
Lens A – D = 1.515
Lens B }
Lens C } D = 1.575
Witnesses
Milton Lenoir
Inventor
Christopher Graf.
Rudolph ...
Attorney

UNITED STATES PATENT OFFICE.

CHRISTOPHER GRAF, OF CHARLES CITY, IOWA, ASSIGNOR TO GRAF LENS CORPORATION, OF SOUTH BEND, INDIANA, A CORPORATION OF INDIANA.

LENS.

1,293,086.      Specification of Letters Patent.      Patented Feb. 4, 1919.

Application filed June 21, 1917. Serial No. 176,203.

*To all whom it may concern:*

Be it known that I, CHRISTOPHER GRAF, a citizen of the United States, residing at Charles City, in the county of Floyd and State of Iowa, have invented certain new and useful Improvements in Lenses; and I do hereby declare the following to be a full, clear, and exact description of the invention, such as will enable others skilled in the art to which it appertains to make and use the same.

This invention relates to improvements in lenses and has for its object to provide a lens particularly adapted for motion picture projectors or stereopticons which will produce a flatter field and greater depth on the screen than existing lens combinations employed for the same purpose with a working aperture of at least F 2.5.

A particular object of the invention is to provide a lens combination which is symmetrical and in which only two surfaces are exposed to require cleansing and which may be easily removed for cleansing purposes and replaced without danger of varying the relative positions of the faces of the elements of the combination.

Another object of the invention is to provide a lens of the character set forth which is easily and cheaply manufactured and in which the variations in radii and thicknesses for various lens diameters and for glasses of varying refractive indices are easily calculated by persons skilled in the art.

The combination, as shown in the accompanying drawing illustrating the same, comprises the double convex lens A and two concavo-convex lenses B and C, the concave faces of which oppose and receive the convex faces of the member A and have the same radius of curvature as the latter, said radius being less than the radius of curvature of the convex faces of the lenses B and C. The thickness of the lens A is equal to the sum of the thicknesses of the lenses B and C, the latter being of equal thickness.

The lenses B and C when made of glass having the index of refraction D=1.575 and for a diameter of 44 millimeters, have convex faces of a radius 80.88 millimeters and concave faces of a radius 38.00 millimeters, the convex faces of the lens A being also of the last-named radius and said lens being made of glass having the index of refraction D=1.515. The thickness of the lenses B and C is 7 millimeters and that of the lens A is 14 millimeters.

The combination may, as hereinbefore stated, be made of glasses of other than the aforesaid refractive indices. Thus for example, if the lens A be composed of glass of the aforesaid index of refraction, viz: D=1.515, the thickness and radius of curvature of the faces of said lens A remain the same, and may be used in combination with lenses B and C composed of glass having the index of refraction D=1.6124 and having convex faces of the radius of curvature 76.00 millimeters, the radius of curvature of the concave faces thereof remaining the same as in the first-named combination viz: 38.00 millimeters.

The three lenses are preferably cemented together, though this is not essential.

The aforesaid combination is particularly advantageous in that it is very easily manufactured and assembled besides giving the added advantage over the combinations now generally employed of a greater flatness of field and greater depth on the screen.

I claim as my invention:

1. A symmetrical lens combination comprising a middle double convex lens having faces of equal radius of curvature and two concavo-convex lenses having concave faces opposing the convex faces of the middle lens and of the same radius of curvature as the latter, and having outer convex faces of substantially double the radius of curvature of the concave faces thereof, said concavo-convex lenses being composed of glass having a higher index of refraction than said middle lens.

2. A symmetrical lens combination comprising a middle double convex lens having faces of equal radius of curvature and two concavo-convex lenses having concave faces opposing the convex faces of the middle lens and of the same radius of curvature as the latter, and having outer convex faces of substantially double the radius of curvature of the concave faces thereof, said concavo-convex lenses being composed of glass having a higher index of refraction than said middle lens, and each thereof being of a thickness equal to one-half the thickness of said middle lens.

3. A symmetrical lens combination comprising a middle double-convex lens composed of glass having the index of refraction D=1.515, diameter 44 millimeters and the radius of curvature of both faces thereof being 38.00 millimeters; two concavo-convex lenses composed of glass of higher refractive index than said middle lens and having concave faces opposing the convex faces of said middle lens and of the same radius of curvature as the latter, the convex faces of said concavo-convex lenses being of at least double the radius of curvature as the concave faces thereof, the thickness of each of said concavo-convex lenses being one-half the thickness of the middle lens.

4. A symmetrical lens combination comprising a middle double-convex lens composed of glass having the index of refraction D=1.515, diameter 44 millimeters and the radius of curvature of both faces thereof being 38.00 millimeters; two concavo-convex lenses composed of glass having the index of refraction D=1.575, and having concave faces opposing the convex faces of said middle lens and of the same radius of curvature as the latter, the convex faces of said concavo-convex lenses having a radius of curvature of 80.88 millimeters, the thickness of each of said concavo-convex lenses being one-half the thickness of the middle lens.

CHRISTOPHER GRAF.

Copies of this patent may be obtained for five cents each, by addressing the "Commissioner of Patents, Washington, D. C."